US007706376B2

(12) United States Patent
Waxman

(10) Patent No.: US 7,706,376 B2
(45) Date of Patent: Apr. 27, 2010

(54) SYSTEM AND METHOD FOR COMMUNICATING WITH MOBILE STATIONS OVER AN EXTENDED RANGE IN A WIRELESS LOCAL AREA NETWORK

(75) Inventor: Shai Waxman, Haifa (IL)

(73) Assignee: Intel Corporation, Santa Clara, CA (US)

(*) Notice: Subject to any disclaimer, the term of this patent is extended or adjusted under 35 U.S.C. 154(b) by 1106 days.

(21) Appl. No.: 11/322,679

(22) Filed: Dec. 30, 2005

(65) Prior Publication Data
US 2007/0153725 A1 Jul. 5, 2007

(51) Int. Cl.
H04L 12/28 (2006.01)
H04L 12/56 (2006.01)

(52) U.S. Cl. .......... 370/393; 370/312; 370/389
(58) Field of Classification Search .......... 370/349, 370/312, 339, 389, 393
See application file for complete search history.

(56) References Cited

U.S. PATENT DOCUMENTS

| 5,818,826 | A | * | 10/1998 | Gfeller et al. ............. 370/342 |
| 7,570,929 | B1 | * | 8/2009 | Trompower ............. 455/114.3 |
| 2005/0135459 | A1 | | 6/2005 | Ginzburg et al. |
| 2006/0285604 | A1 | * | 12/2006 | Walton et al. ............. 375/267 |

* cited by examiner

Primary Examiner—Edward Urban
Assistant Examiner—Christian A Hannon
(74) Attorney, Agent, or Firm—Schwegman, Lundberg & Woessner, P.A.; Gregory J. Gorrie

(57) ABSTRACT

Embodiments of a system and method for communicating over an extended range in a wireless network are generally described herein. Other embodiments may be described and claimed. In some embodiments, a packet is generated to include an extended range header if the mobile station is identified as an extended range mobile station. The extended range header and a data portion of the packet have a lower data rate than packets for regular range mobile stations and are encoded to correspond to rates for un-encoded transmissions to the regular range mobile stations.

30 Claims, 4 Drawing Sheets

WIRELESS COMMUNICATION NETWORK

SYSTEM AND METHOD FOR COMMUNICATING WITH MOBILE STATIONS OVER AN EXTENDED RANGE IN A WIRELESS LOCAL AREA NETWORK

TECHNICAL FIELD

Some embodiments of the present invention pertain to wireless communication systems. Some embodiments relate to wireless local area networks (WLANs).

BACKGROUND

One problem with conventional wireless local area networks (WLANs) is the limited range over which they operate. The range of many conventional WLANs is limited to a couple of hundred meters. These range limitations result from restrictions on transmission power and minimal packet encoding rates. Mobile stations that are outside the range of an access point generally experience a greater signal-to-noise ratio (SNR) making it difficult, if not impossible, to acquire and decode WLAN packets.

Thus there are general needs for methods and WLANs that operate over an extended range. There are also general needs for methods and WLANs that operate over an extended range and which are compatible with current WLANs.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
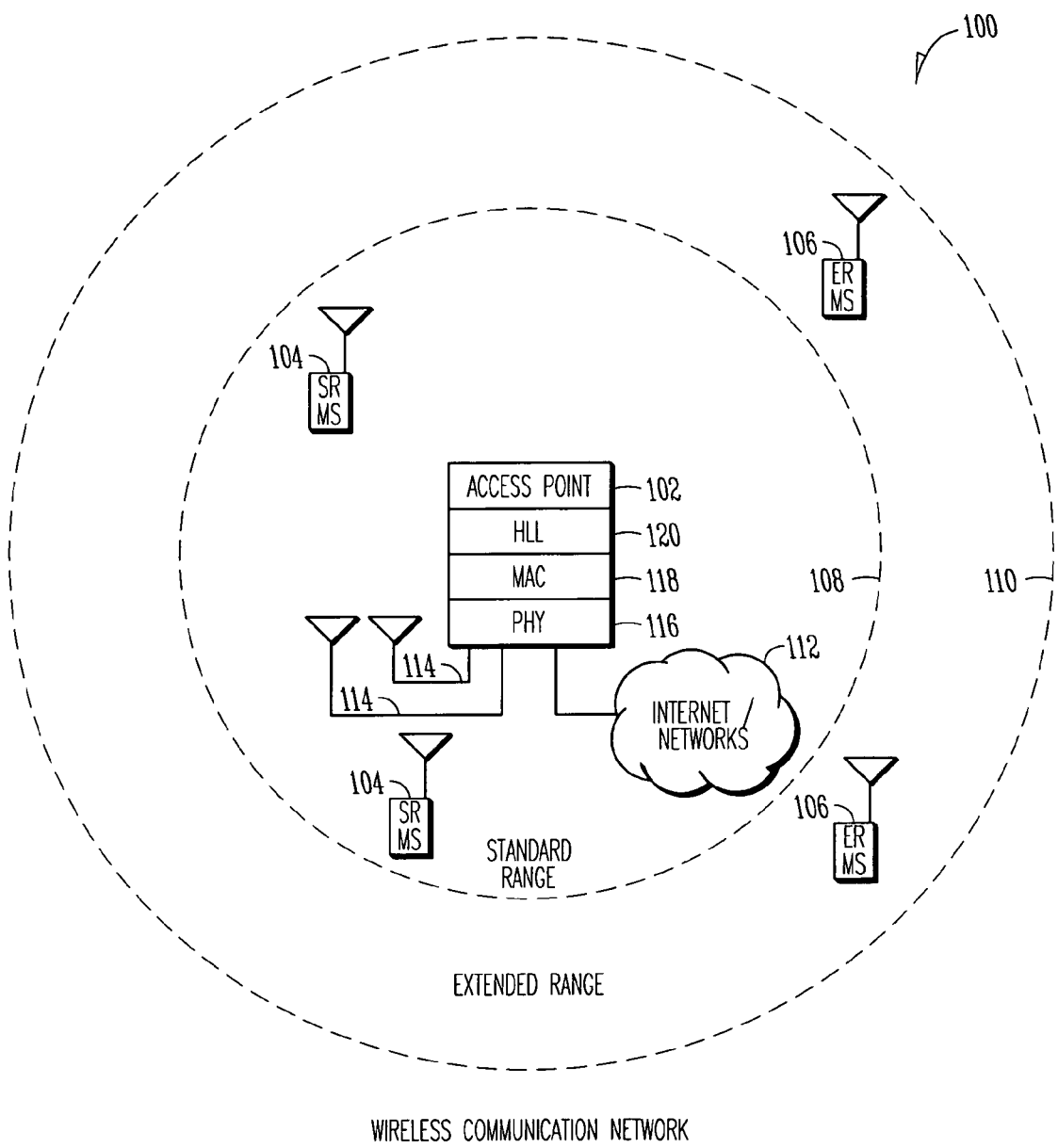
FIG. 1 illustrates a wireless communication network in accordance with some embodiments of the present invention.

FIG. 1 illustrates a wireless communication network in accordance with some embodiments of the present invention. Wireless communication network 100 includes an access point (AP) 102 and one or more mobile stations, generally shown as 104 and 106. Mobile stations 104 and 106 may include one or more standard (i.e., regular) range mobile stations (SR MS) 104 and one or more extended range mobile stations (ER MS) 106. Access point 102 may communicate using radio-frequency (RF) signals with mobile stations 104 and 106 allowing mobile stations 104 and 106 to communicate amongst each other as well as allowing mobile stations 104 and 106 to communicate with external networks 112, such as the Internet. In accordance with some embodiments, access point 102 may communicate with standard range mobile stations 104 within standard range 108, and access point 102 may communicate with extended range mobile stations 106 within extended range 110. Extended range 110 may encompass a much larger geographic area than standard range 108 and may include standard range 108. In one example, standard range 108 may extend up to a couple hundred meters in an unobstructed environment (e.g., outdoors) from access point 102 while extended range 110 may extend up to a thousand or more meters in an unobstructed environment from access point 102, although the scope of the invention is not limited in this respect.

To help extended range mobile stations 106 with signal acquisition and data detection, in accordance with some embodiments of the present invention, access point 102 may transmit packets (e.g., the packet 300 of FIG. 3) with a longer preamble relative to packets associated with standard range mobile stations 104. At least portions of the packets may be encoded with a lower coding rate. The longer preamble may include an additional header portion, referred to as an extended range header. These embodiments are described in more detail below.

In some embodiments, access point 102 may include physical (PHY) layer circuitry 116 for communicating with the physical mediums (e.g., wireless and/or wireline), media access control (MAC) layer circuitry 118 and higher-level layer (HLL) circuitry 120. PHY layer circuitry 116, media access control layer circuitry 118 and higher-level layer circuitry 120 may comprise functionality for both receiver and transmitter operations and may include processing circuitry to evaluate communications from mobile stations 104 and 106, among other things.

In some embodiments, access point 102 may be a Wireless Fidelity (WiFi) access point. In one example, access point 102 may operate in accordance with one or more of the 802.11 family of standards developed by the Institute of Electrical and Electronic Engineers (IEEE) and/or variations and evolutions of these standards. In some other embodiments, wireless communication network 100 may be a broadband wireless access (BWA) network and access point 102 may be a Worldwide Interoperability for Microwave Access (WiMax) base station or other broadband communication station, although the scope of the invention is not limited in this respect. In one example, access point 102 may be a base station operating in accordance with one or more of the 802.16 family of standards developed by IEEE and/or variations and evolutions of these standards. In some embodiments, wireless communication network 100 may be a wireless local area network (WLAN) that may provide extended range capabilities as described herein. Alternatively, the wireless communication network 100 may be a wireless personal area network (WPAN), a wireless metropolitan area network (WMAN), or a wireless wide area network (WWAN). In some embodiments, mobile stations 104 and 106 may operate in a carrier sense multiple access (CSMA) mode.

In some embodiments, access point 102 may communicate with mobile stations 104 and 106 using spread-spectrum signals within one or more frequency spectrums. In some other embodiments, access point 102 may communicate using orthogonal frequency division multiplexed (OFDM) communication signals within one or more frequency spectrums. In some embodiments, access point 102 may communicate with mobile stations 104 and 106 selectively using either spread-spectrum signals or OFDM communication signals. The OFDM signals may comprise a plurality of orthogonal subcarriers. In some embodiments, the orthogonal subcarriers may be closely spaced OFDM subcarriers. To help achieve orthogonality between the closely spaced subcarriers, each subcarrier may have a null at substantially a center frequency of the other subcarriers and/or each subcarrier may have an integer number of cycles within a symbol period, although the scope of the invention is not limited in this respect.

In some embodiments, the frequency spectrums used by access point 102 may comprise either a 5 gigaHertz (GHz) frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some BWA network embodiments, the frequency spectrum for communications may comprise frequencies between 2 and 11 GHz, although the scope of the invention is not limited in this respect.

In some embodiments, access point 102 may communicate in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for WLANs, although other techniques may also be suitable. In some BWA network and WiMax embodiments, access point 102 may communicate in accordance with the IEEE 802.16-2004 and IEEE 802.16(e) standards for wireless metropolitan area networks (WMANs) including variations and evolutions thereof. For more information with respect to IEEE 802.11 and IEEE 802.16 standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical (PHY) Layer, ISO/IEC 8802-11: 1999" and related amendments/versions, and "Corrigendum to IEEE Standard for Local and Metropolitan Area Networks—Part 16: Air Interface for Fixed Broadband Wireless Access Systems," May 2005.

In some embodiments, mobile stations 104 and 106 may be portable wireless communication devices, such as personal digital assistants (PDAs), laptops or portable computers with wireless communication capability, web tablets, wireless telephones, wireless headsets, pagers, instant messaging devices, digital cameras, televisions, medical devices (e.g., a heart rate monitor, a blood pressure monitor, etc.), or other devices that may receive and/or transmit information wirelessly.

Antennas 114 used by access point 102 and the antennas of mobile stations 104 and 106 may comprise one or more directional or omnidirectional antennas, including, for example, dipole antennas, monopole antennas, patch antennas, loop antennas, microstrip antennas or other types of antennas suitable for transmission of RF signals. In some embodiments, access point 102 and the antennas of mobile stations 104 and 106 may use two or more antennas. In some embodiments, instead of two or more antennas, a single antenna with multiple apertures may be used.

Figure 2:
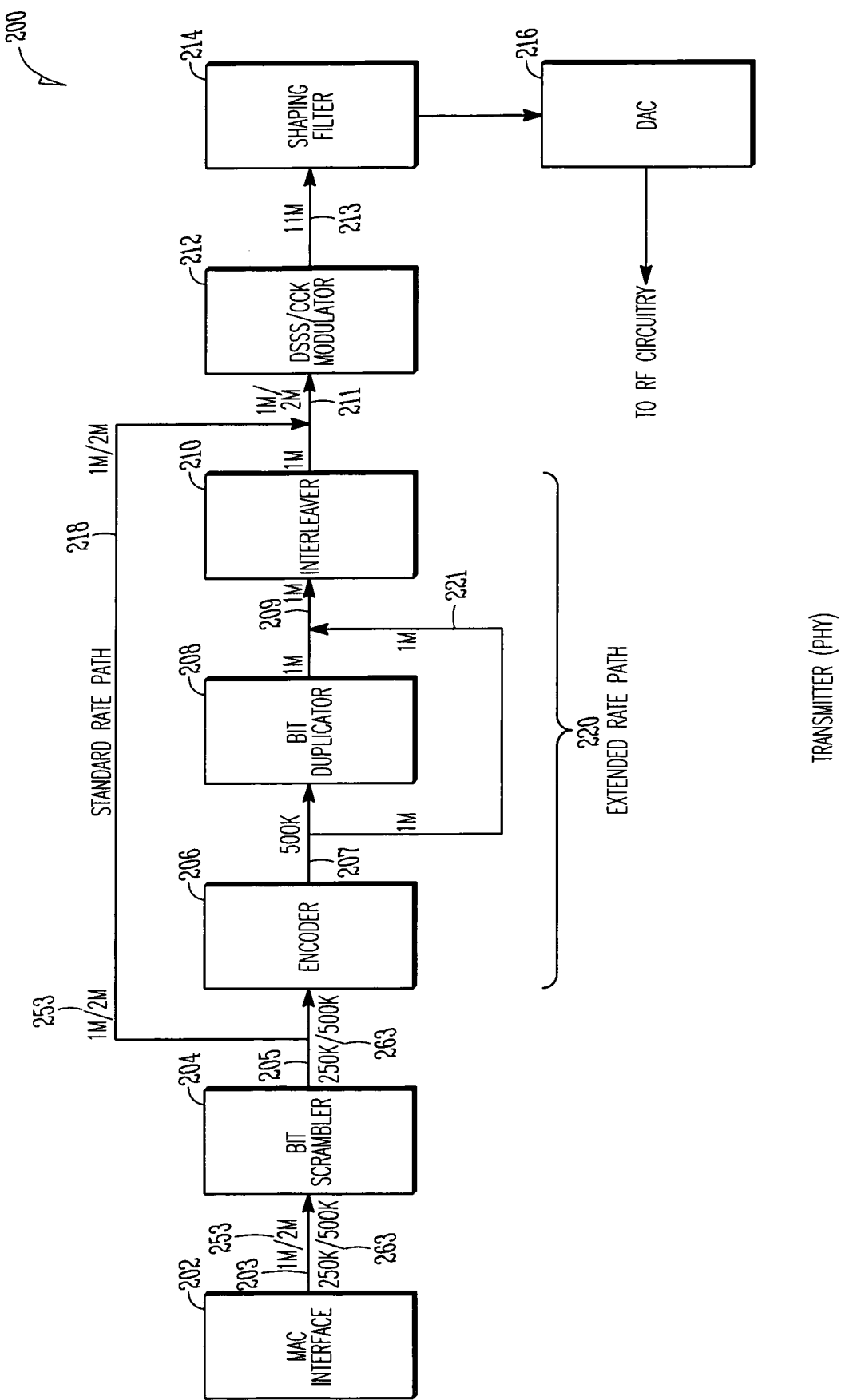
FIG. 2 is a block diagram of a transmitter portion of a wireless communication station in accordance with some embodiments of the present invention.

FIG. 2 is a block diagram of a transmitter portion of a wireless communication station in accordance with some embodiments of the present invention. Transmitter portion 200 may be suitable for use as a transmitter portion of access point 102 (FIG. 1), although other transmitter configurations may also be suitable. Transmitter portion 200 may be a portion of the physical layer of a transmitter of a wireless communication device and may correspond to physical layer circuitry 116 (FIG. 1). Other layers, such as media access control layer, as well as some of the circuitry of the physical layer, are not illustrated in FIG. 2. Transmitter portion 200 may generate data for transmission to both extended range mobile stations 106 (FIG. 1) as well as standard range mobile stations 104 (FIG. 1).

MAC interface 202 interfaces with the MAC layer (e.g., MAC layer 118 (FIG. 1)) of the communication station and may provide bit stream 203 at one of a plurality of data rates depending on, among other things, whether the transmission is intended for a standard range mobile station or an extended range mobile station. MAC interface 202 may provide bit stream 203 at standard data rates 253 for one or more of standard range mobile stations 104 (FIG. 1). MAC interface 202 may provide bit stream 203 at extended range data rates 263 for one or more of extended range mobile stations 106 (FIG. 1). In some embodiments, standard data rates 253, for example, may include either a 1 Megabit-per-second (Mbps) rate or a 2 Mbps rate, and extended range data rates 263, for example, may include either a 250 Kilobit-per-second (Kbps) rate or a 500 Kbps rate, although the scope of the invention is not limited in this respect.

Transmitter portion 200 includes standard rate path 218 for generated standard range packets and extended rate path 220 for generating extended range packets. Extended rate path 220 includes encoder 206, bit duplicator 208 and interleaver 210. Bit stream 203 may be scrambled by bit scrambler 204 and the scrambled bits may be provided to encoder 206 for extended-range operations or directly to modulator 212 for standard range operations.

For extended range operations, encoder 206 may perform error-correction encoding operations on input bit stream 205 by adding redundant bits and generating output bit stream 207. When encoder 206 operates at an encoding rate of 1/2, for example, two output bits are generated for each input bit resulting in data rates at the output of encoder 206 of 500 Kbps and 1 Mbps for extended range data rates 263 of 250 Kbps and 500 Kbps respectively. In some embodiments, bit duplicator 208 may operate on the 500 Kbps data output of encoder 206 by duplicating the input to generate output 209 at a rate of 1 Mbps. The 1 Mbps rate output from encoder 206 may bypass bit duplicator 208 using bypass path 221. Interleaver 210 may perform an interleaving operation on blocks of encoded bits provided by either bit duplicator 208 or encoder 206 to provide interleaved blocks of output bits in a bit stream. For extended range operations, in some embodiments, interleaver 210 may provide bit stream 211 at a rate of 1 Mbps for both extended range rates 263 of 250 Kbps and 500 Kbps, although the scope of the invention is not limited in this respect. Bit stream 211 may be provided by interleaver 210 to modulator 212. Although encoder 206, bit duplicator 208 and interleaver 210 are illustrated in a particular order, there is no requirement that their operations be performed in the order illustrated.

Modulator 212 may receive bit stream 211 from either interleaver 210 for extended range operations or from bit scrambler 204 for standard range operations and may modulate bit stream 211 to generate modulated bit stream 213. In accordance with some embodiments, bit stream 211 may be provided to modulator 212 at a rate of 1 Mbps for extended range operations, and bit stream 211 may be provided to modulator 212 at a rate of either 1 Mbps or 2 Mbps for standard range operations, although the scope of the invention is not limited in this respect.

In some embodiments, modulator 212 may multiply bit stream 211 by a spreading sequence to generate a spread-spectrum modulated bit stream as its output. In some embodiments, modulator 212 may be a direct sequence spread-spectrum (DSSS) modulator. In some embodiments, the spreading sequence may be 11 bits long providing an 11 Mega-samples-per-second (Msps) output, although the scope of the invention is not limited in this respect. In some embodiments, modulator 212 may perform complementary code keying (CCK) as part of spread-spectrum modulation, although the scope of the invention is not limited in this respect.

Modulated bit stream 213 may be provided to shaping filter 214 to limit the spectral mask of the RF transmissions of the transmitter. The operation of shaping filter 214 may depend on the frequency range of operation. In some embodiments, when transmitter portion 200 transmits in the 5 GHz frequency spectrum, shaping filter 214 may limit the spectral mask to 20 MHz. In some embodiments, when transmitter portion 200 transmits in the 2.4 GHz frequency spectrum, shaping filter 214 may limit the spectral mask to 25 MHz, although the scope of the invention is not limited in this respect.

After the operation of shaping filter 214, the modulated signals may be converted from a digital form to analog signals by digital-to-analog converter (DAC) 216 for subsequent upconversion by RF circuitry before transmission by one or more antennas.

In some embodiments, encoder 206 may apply a convolutional encoding rate of 1/2 to extended range rates 263 (e.g., 250 Kbps and 500 Kbps) which may be identical to rates used in some OFDM transmitters. In some embodiments, the bit duplication of bits comprising the 250 Kbps rate by bit duplicator 208 to a 500 Kbps rate may create an effective code rate of 1/4, although the scope of the invention is not limited in this respect.

In some embodiments, transmitter portion 200 may utilize an effective bandwidth similar to OFDM modulations in the 5 GHz band. Shaping filter 214 may permit the transmission of a more spectrally efficient DSSS signal within a required spectral mask so that it may be received by some conventional DSSS receivers, although the scope of the invention is not limited in this respect.

Although transmitter portion 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of transmitter portion 200 may refer to one or more processes operating on one or more processing elements.

Figure 3:
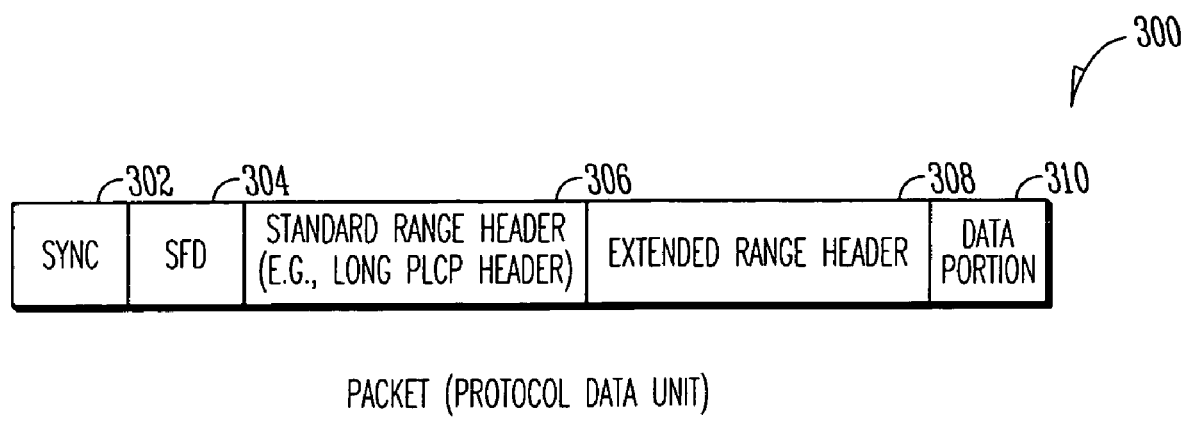
FIG. 3 illustrates a packet in accordance with some embodiments of the present invention.

FIG. 3 illustrates a packet in accordance with some embodiments of the present invention. Packet 300 (e.g., a protocol data unit) may be generated by a communication station such as access point 102 (FIG. 1) for communicating with both standard range mobile stations 104 (FIG. 1) and/or extended range mobile stations 106 (FIG. 1). In accordance with some embodiments, packet 300 may include synchronization (SYNC) field 302, start frame delimiter (SFD) 304, standard range header 306, and data portion 310. For extended range operations, packet 300 may also include extended range header 308.

Synchronization field 302 may comprise a predetermined sequence to allow a mobile station to time-synchronize with packet 300. Synchronization field 302 may also be used for channel/frequency estimation. Start-frame delimiter 304 may comprise a binary pattern for use in indicating the end of synchronization field and indicating the beginning of a subsequent field.

In some embodiments, standard range header 306 may be a legacy long header, such as a physical layer convergence protocol (PLCP) header, with a signal field that may indicate a 1 Mbps rate and with a length field that may indicate the length of a data field for a 1 Mbps rate packet. This length may be equivalent in time to the length of extended range packets encoded with extended range rates (e.g., 500 Kbps or 250 Kbps rates), which, for example, may be two times or four times longer respectively. In some embodiments, extended range header 308 may be encoded with one of the extended ranges rates (e.g., the 250 Kbps rate). In some embodiments, the duration of extended range header 308 may be about 84 microseconds. In some embodiments, extended range header 308 may comprise about 21 bits including 1 bit to indicate the particular extended range rate (e.g., 256 Kbps or 512 Kbps), 11 bits for length, 3 bits for the cyclic-redundancy check (CRC) bits and 6 tail bits for code termination, although the scope of the invention is not limited in this respect.

Referring to FIG. 2 and FIG. 3 together, in some embodiments, a mobile station may be identified as either a standard range mobile station or an extended range mobile station. Access point 102 (FIG. 1) may generate packet 300 to include an extended range header 308 when the mobile station is identified as an extended range mobile station. In these embodiments, extended range header 308 and data portion 310 may have a lower data rate than packets generated for standard range mobile stations. The packets having extended range header 308 may be encoded in a manner to correspond to higher rates for un-encoded transmissions to standard range mobile stations. In some embodiments, when packet 300 has extended range header 308, data portion 310 may be convolutionally encoded with a lower convolutional coding rate, such as 1/2. This lower encoding rate may provide a reduced amount of redundancy than is provided packets that are conventionally encoded for mobile stations that may operate in accordance with standards that use orthogonal frequency division multiplexed OFDM transmissions. This lower encoding rate, however, may provide for improved signal acquisition and data decoding by effectively improving the SNR at the receiver.

In some embodiments, generating a packet for a mobile station identified as a standard range mobile station (e.g., standard range mobile station 104 of FIG. 1) includes refraining from performing the error-correction encoding operation and the interleaving operation on data portion 310 of the packet. In some embodiments, packets generated for standard range mobile stations may take standard range path 218 bypassing encoding operations, bit-duplication operations and interleaving operations.

In some embodiments, the error-correcting operation performed by encoder 206 may be a convolutional encoding operation with a rate of 1/2 allowing encoder 206 to provide an output bit stream at a rate of 500 Kbps for an input rate of 250 Kbps, and to provide an output bit stream at a rate of 1 Mbps for an input rate of 500 Kbps, as illustrated in FIG. 2. Although extended range operation of transmitter portion 200 is described as using rates 250 Kbps and 500 Kbps, the scope of the invention is not limited in this respect as other rates may be equally suitable. In some embodiments, the interleaving operation performed by interleaver 210 may be a block interleaving operation, such as a block interleaving operation in accordance with the IEEE 802.11(a) standard, although the scope of the invention is not limited in this respect.

In some embodiments, extended range header 308 may indicate one of a plurality of extended range data rates 263 (e.g., either the 250 Kbps rate or the 500 Kbps rate) of data portion 310 following the extended range header 308. In these embodiments, generating packet 300 for a mobile station identified as an extended range mobile station may also include performing a bit duplication operation by bit duplicator 208 on the data to generate data portion 310 for a first (e.g., the 250 Kbps rate) of extended range data rates 263, and refraining from performing the bit duplication operation to generate data portion 310 for a second (e.g., the 500 Kbps rate) of extended range data rates 263. In these embodiments, extended range header 308 may comprise the first (e.g., the 250 Kbps rate) of extended range data rates 263, although the scope of the invention is not limited in this respect.

In some embodiments, when a mobile station is identified as a standard range mobile station, standard range header 306 may be included in packet 300 and extended range header 308 may be refrained from being included in packet 300. In these embodiments, when a mobile station is identified as a standard range mobile station, transmitter portion 200 may refrain from performing an encoding operation, a bit duplication operation and an interleaving operation on data for data portion 310 of packet 300.

In some embodiments, packet 300 may include standard range header 306 when the mobile station is a standard range mobile station, and packet 300 may include both standard range header 306 and extended range header 308 when the mobile station is an extended range mobile station.

In some embodiments, packet 300 may be transmitted to a mobile station using DSSS modulation, and in some embodiments, the DSSS modulation may use CCK, although the scope of the invention is not limited in this respect. In some embodiments, the spread-spectrum transmissions may be in accordance with either the IEEE 802.11(b) or the IEEE 802.11(g) standards although the scope of the invention is not limited in this respect. In some embodiments, the spread-spectrum transmission may be within a 5 GHz frequency spectrum, although the scope of the invention is not limited in this respect. These spread-spectrum transmissions may be distinguishable from OFDM transmissions, conventionally used in a 5 GHz frequency spectrum.

In some embodiments, standard range mobile stations may be unable to decode packets that include extended range header 308 and data portion 310 because extended range header 308 and data portion 310 are transmitted at non-standard rates. In these embodiments, upon receipt of packet 300 that includes extended range header 308, a standard range mobile station may determine a length of packet 300 from standard range header 306 and may refrain from transmitting during extended range header 308 and data portion 310.

In some embodiments, upon receipt of packet 300 directed to an extended range mobile station, the extended range mobile station may determine whether the packet includes the extended range header 308 by attempting to decode bits following the standard range header (e.g., the portion of the packet presumed to be extended range header 308) while buffering or storing the decoded bits. The extended range mobile station may flush the buffered decoded bits when the extended range header 308 is detected and may stream the buffered decoded bits when extended range header 308 is not detected. In these embodiments, an extended range mobile station may be able to decode packets that include extended range header 308 as well as packets that do not include extended range header.

In some embodiments, mobile stations may operate in a CSMA mode. In these embodiments, a mobile station may be identified as either a standard range mobile station or an extended range mobile station based on transmissions by the mobile station. In some embodiments, the mobile station may be identified as either a standard range mobile station or an extended range mobile station based on a probe issued by the mobile station, although the scope of the invention is not limited in this respect.

In some embodiments, detection of start frame delimiter 304 and proper header reception may not be essential for receiving an extended range packet because time synchronization and channel/frequency estimation may be performed using synchronization field 302.

In some embodiments, a mobile station may discriminate between a standard range packet and an extended range packet by decoding the "assumed to be" extended range header while in parallel storing the standard decoder bits (e.g., equalizer output/input to hard-decision outputs from the decoder) in a buffer. In some embodiments, a mobile station may discriminate between a standard range packet and an extended range packet by rotating symbols of extended range header 308.

The use of extended range header 308 in accordance with some embodiments of the present invention may be backward compatible with some conventional preambles and there may be no need for protected transmissions when an access point transmits. Furthermore, there may be a higher potential transmission power further increasing the range.

Figure 4:
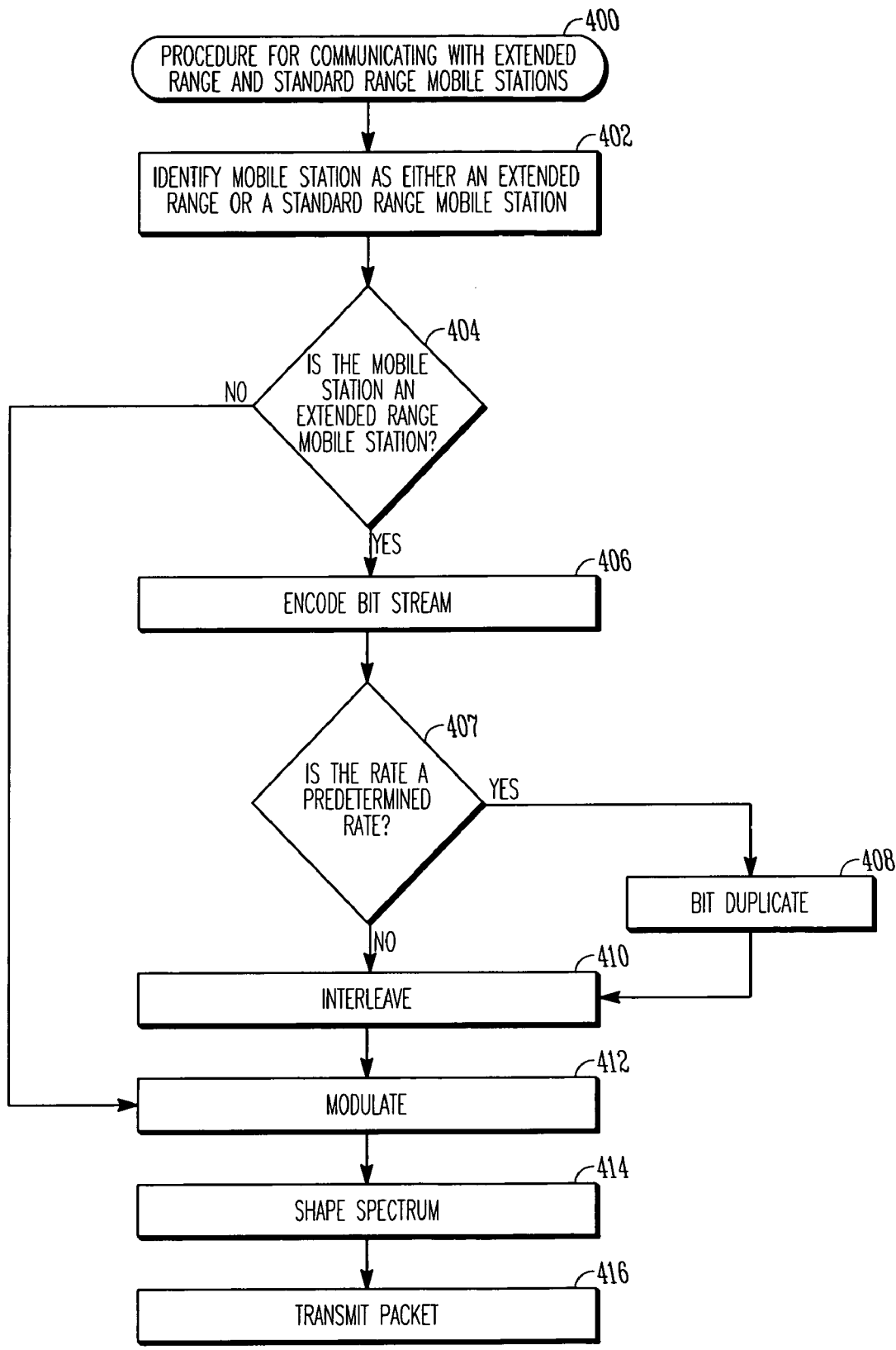
FIG. 4 illustrates a procedure for communicating with extended range and standard range mobile stations.

FIG. 4 illustrates a procedure for communicating with extended range and standard range mobile stations. In some embodiments, procedure 400 may be performed by an access point, such as access point 102 (FIG. 1), although the scope of the invention is not limited in this respect.

Operation 402 comprises identifying a mobile station as either an extended range mobile station or a standard range mobile station. Transmissions by the mobile station may be used to determine whether a mobile station is an extended range mobile station or a standard range mobile station.

Operation 404 determines if the mobile station is an extended range mobile station. If the station is determined to be an extended range mobile station, operations 406 through 416 are performed. If the station is determined to be a standard range mobile station, operations 412 through 416 are performed.

Operation 406 comprises encoding a bit stream provided at one of the extended range rates. Operation 406 may be performed by encoder 206 (FIG. 2), although the scope of the invention is not limited in this respect.

Operation 407 determines whether the extended range rate at which the data is provided is a predetermined extended range rate (e.g., a 250 Kbps rate). If operation 407 determines that the rate is the predetermined extended range rate, operation 408 is performed. If operation 407 determines that the rate is not the predetermined extended range rate, operation 408 is skipped and operation 410 is performed.

Operation 408 performs a bit duplication on the encoded bit stream. In some embodiments, operation 408 may be performed by bit duplicator 208 (FIG. 2), although the scope of the invention is not limited in this respect.

Operation 410 comprises performing an interleaving operation on the encoded bit stream. In some embodiments, operation 410 may be performed by interleaver 210 (FIG. 1), although the scope of the invention is not limited in this respect.

Operation 412 modulates the bit stream, which may be provided at the same rate whether the bit stream is intended for an extended range or standard range mobile station. In some embodiments, operation 412 may be performed by modulator 212 (FIG. 2), although the scope of the invention is not limited in this respect.

Operation 414 comprises shaping the spectrum of the modulated signals and may be performed by shaping filter 214 (FIG. 2), although the scope of the invention is not limited in this respect.

Operation 416 comprises transmitting the packet to either extended range mobile station or a standard range mobile station. In some embodiments, a packet structured such as packet 300 (FIG. 3) may be transmitted.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing or transmitting information in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. A method of communicating with mobile stations over an extended range comprising:
   identifying a mobile station as either a regular range mobile station or an extended range mobile station; and
   generating a packet to include an extended range header in addition to a regular range header when the mobile station is identified as an extended range mobile station, the packet with the extended range header being destined for the extended range mobile station;
   refraining from including the extended range header in the packet when the mobile station is identified as a regular range mobile station; and
   including a start frame delimiter (SFD) in the packet for both a regular range and a standard range mobile station,
   wherein the extended range header and a data portion of the packet have a lower data rate than packets generated for regular range mobile stations, the packet being encoded in a manner to correspond to higher rates for transmissions to the regular range mobile stations, and
   wherein the extended range header indicates one of a plurality of extended range data rates of the data portion of the packet following the extended range header.

2. The method of claim 1 wherein generating the packet for a mobile station identified as an extended range mobile station includes performing an error-correction encoding operation and an interleaving operation on data to generate the data portion of the packet, and
   wherein generating the packet for a mobile station identified as a regular range mobile station includes refraining from performing the error-correction encoding operation and the interleaving operation on the data portion of the packet.

3. The method of claim 2 further comprising:
   including a preamble and the regular range header in the packet; and
   modulating the packet for transmission to a mobile station using direct sequence spread-spectrum (DSSS) modulation,
   wherein the preamble comprises a synchronization field for channel estimation and the start frame delimiter,
   wherein the regular range header comprises a physical layer convergence protocol (PLCP) header, and
   wherein the including and the modulating are performed for both a regular range mobile station and an extended range mobile station.

4. The method of claim 2
   wherein generating the packet for a mobile station identified as an extended range mobile station further includes:
   performing a bit duplication operation on the data to further generate the data portion of the packet for a first of the extended range data rates; and
   refraining from performing the bit duplication operation for a second of the extended range data rates,
   wherein the extended range header is encoded at the first of the extended range data rates.

5. The method of claim 4 wherein performance of the encoding operation and the bit duplication operation provides an output data rate equaling a data rate of one of a plurality of regular range data rates prior to performing spread-spectrum modulation.

6. The method of claim 5 wherein the regular range data rates are at least one of either two or four times the extended range data rates.

7. The method of claim 4 wherein the extended range header and the data portion of the packet for an extended range mobile station, as a result of the encoding and bit duplication operations, effectively increase a signal-to-noise (SNR) ratio of a received signal during packet acquisition at the extended range mobile station to help allow the extended range mobile station to perform signal acquisition and data decoding.

8. The method of claim 4 further comprising transmitting the packet to a mobile station using spread-spectrum modulation when the mobile station has been identified as either a regular range mobile station or an extended range mobile station,
   the packet including the regular range header when the mobile station is identified as a regular range mobile station, the packet including both the regular range header and the extended range header when the mobile station is an extended range mobile station.

9. The method of claim 4, wherein when the mobile station is identified as a regular range mobile station, the method further comprises:
including the regular range header in the packet; and
refraining from performing the encoding operation, the bit duplication operation and the interleaving operation on data for the data portion of the packet, and
wherein when the mobile station is identified as an extended range mobile station, the method further comprises including the regular range header in the packet destined for the extended range mobile station, the extended range header being in addition to the regular range header.

10. The method of claim 9, wherein upon receipt of the packet that includes the extended range header, a regular range mobile station determines a length of the packet from the regular range header and refrains from transmitting during the extended range header and the data portion.

11. The method of claim 8 wherein, upon receipt of the packet directed to an extended range mobile station, the extended range mobile station determines whether the packet includes the extended range header by attempting to decode bits following the regular range header while buffering the decoded bits, and
wherein the extended range mobile station flushes the buffered decoded bits when the extended range header is detected and streams the buffered decoded bits when the extended range header is not detected.

12. The method of claim 1 wherein the mobile stations operate in a carrier sense multiple access (CSMA) mode, and
wherein the mobile station is identified as either a regular range mobile station or an extended range mobile station based on transmissions by the mobile station.

13. A wireless communication device for communicating with mobile stations over an extended range comprising:
processing circuitry to identify a mobile station as either a regular range mobile station or an extended range mobile station; and
physical layer circuitry to generate a packet to include an extended range header in addition to a regular range header when the mobile station is identified as an extended range mobile station, the packet with the extended range header being destined for the extended range mobile station, the physical layer circuitry to encode the extended range header and a data portion of the packet with a lower data rate than packets generated for regular range mobile stations, the physical layer circuitry to encode the packet in a manner to correspond to higher rates for transmissions to the regular range mobile stations,
wherein the physically layer circuitry refrains from including the extended range header in the packet when the mobile station is identified as a regular range mobile station, and includes a start frame delimiter (SFD) in the packet for both a regular range and a standard range mobile station, and
wherein the extended range header indicates one of a plurality of extended range data rates of the data portion of the packet following the extended range header.

14. The wireless communication device of claim 13 wherein the physical layer circuitry comprises an error-correction encoder and an interleaver to perform, respectively, an error-correction encoding operation and an interleaving operation on data to generate the data portion of the packet for a mobile station identified as an extended range mobile station, and
wherein the physical layer circuitry further comprises a standard-rate path to allow the physical layer circuitry to refrain from performance of the error-correction encoding operation and the interleaving operation on the data portion of the packet for a mobile station identified as a regular range mobile station.

15. The wireless communication device of claim 14 wherein the physical layer circuitry further comprises a modulator to modulate the packet for transmission to a mobile station using direct sequence spread-spectrum (DSSS) modulation,
wherein the physical layer circuitry includes a preamble and the regular range header in the packet,
wherein the preamble comprises a synchronization field for channel estimation and the start frame delimiter,
wherein the regular range header comprises a physical layer convergence protocol (PLCP) header, and
wherein the modulator modulates the packet using the DSSS modulation for both a regular range mobile station and an extended range mobile station.

16. The wireless communication device of claim 14 wherein the physical layer circuitry further comprises a bit duplicator to perform a bit duplication operation on the data to further generate the data portion of the packet for a first of the extended range data rates,
wherein the standard rate path allows the physical layer circuitry to refrain from performing the bit duplication operation for a second of the extended range data rates, and
wherein the error-correction encoder encodes the extended range header at the first of the extended range data rates.

17. The wireless communication device of claim 16 wherein the physical layer circuitry further comprises a spread-spectrum modulator, and
wherein performance of the encoding operation by the error correction encoder and the bit duplication operation by the bit duplicator provides an output data rate equaling a data rate of one of a plurality of regular range data rates prior to performance of spread-spectrum modulation by the spread-spectrum modulator.

18. The wireless communication device of claim 17 wherein the regular range data rates are at least one of either two or four times the extended range data rates.

19. The wireless communication device of claim 16 wherein the extended range header and the data portion of the packet for an extended range mobile station, as a result of the encoding and bit duplication operations, effectively increase a signal-to-noise (SNR) ratio of a received signal during packet acquisition at the extended range mobile station to help allow the extended range mobile station acquire a signal and decode data.

20. The wireless communication device of claim 16 wherein the physical layer circuitry further comprises a spread-spectrum modulator to transmit the packet to a mobile station using spread-spectrum modulation when the mobile station has been identified as either a regular range mobile station or an extended range mobile station,
the packet including the regular range header when the mobile station is identified as a regular range mobile station, the packet including both the regular range header and the extended range header when the mobile station is an extended range mobile station.

21. The wireless communication device of claim 16 wherein when the processing circuitry identifies the mobile station as a regular range mobile station, the physical layer circuitry includes the regular range header in the packet, and utilizes the standard rate path to refrain from performing the encoding operation, the bit duplication operation and the interleaving operation on data for the data portion of the packet, and wherein when the processing circuitry identifies the mobile station as an extended range mobile station, the physical layer circuitry includes the regular range header in the packet destined for the extended range mobile station in addition to the regular range header.

22. The wireless communication device of claim 21 wherein upon receipt of the packet that includes the extended range header, a regular range mobile station determines a length of the packet from the regular range header and refrains from transmitting during the extended range header and the data portion.

23. The wireless communication device of claim 20 wherein upon receipt of the packet directed to an extended range mobile station, an extended range mobile station determines whether the packet includes the extended range header by attempting to decode bits following the regular range header while buffering the decoded bits, the extended range mobile station flushes the buffered decoded bits when the extended range header is detected and streams the buffered decoded bits when the extended range header is not detected.

24. The wireless communication device of claim 13 wherein the mobile stations operate in a carrier sense multiple access (CSMA) mode, and wherein the processing circuitry identifies the mobile station as either a regular range mobile station or an extended range mobile station based on transmissions by the mobile station.

25. A system comprising:

one or more substantially omnidirectional antennas:

processing circuitry to identify a mobile station as either a regular range mobile station or an extended range mobile station; and physical layer circuitry to transmit a packet to the mobile station using the one or more antennas, the packet to include an extended range header in addition to a regular range header when the mobile station is identified as an extended range mobile station, the packet with the extended range header being destined for the extended range mobile station, the physical layer circuitry to encode the extended range header and a data portion of the packet with a lower data rate than packets generated for regular range mobile stations, the physical layer circuitry to encode the packet in a manner to correspond to higher rates for transmissions to the regular range mobile stations, wherein the physically layer circuitry refrains from including the extended range header in the packet when the mobile station is identified as a regular range mobile station, and includes a start frame delimiter (SFD) in the packet for both a regular range and a standard range mobile station, and wherein the extended range header indicates one of a plurality of extended range data rates of the data portion of the packet following the extended range header.

26. The system of claim 25 wherein the physical layer circuitry comprises an error-correction encoder and an interleaver to perform, respectively, an error-correction encoding operation and an interleaving operation on data to generate the data portion of the packet for a mobile station identified as an extended range mobile station, and wherein the physical layer circuitry further comprises a standard-rate path to allow the physical layer circuitry to refrain from performance of the error-correction encoding operation and the interleaving operation on the data portion of the packet for a mobile station identified as a regular range mobile station.

27. The system of claim 26 wherein the physical layer circuitry further comprises a modulator to modulate the packet for transmission to a mobile station using direct sequence spread-spectrum (DSSS) modulation, wherein the physical layer circuitry includes a preamble and the regular range header in the packet, wherein the preamble comprises a synchronization field for channel estimation and the start frame delimiter, wherein the regular range header comprises a physical layer convergence protocol (PLCP) header, and wherein the modulator modulates the packet using the DSSS modulation for both a regular range mobile station and an extended range mobile station.

28. A computer-readable medium that stores instructions for execution by one or more processors to perform operations for communicating with mobile stations over an extended range, the operations to cause the one or more processors to:

identify a mobile station as either a regular range mobile station or an extended range mobile station;

generate a packet to include an extended range header in addition to a regular range header when the mobile station is identified as an extended range mobile station, the packet with the extended range header being destined for the extended range mobile station, refrain from including the extended range header in the packet when the mobile station is identified as a regular range mobile station; and include a start frame delimiter (SFD) in the packet for both a regular range and a standard range mobile station, wherein the extended range header and a data portion of the packet are encoded with a lower data rate than packets for regular range mobile stations, the packet being encoded in a manner to correspond to higher rates for transmissions to the regular range mobile stations.

29. The computer-readable medium of claim 28 wherein the operations further cause the one or more processors to:

generate the packet for a mobile station identified as an extended range mobile station by performing an error-correction encoding operation and an interleaving operation on data to generate the data portion of the packet; and generate the packet for a mobile station identified as a regular range mobile station by refraining from performing the error-correction encoding operation and the interleaving operation on the data portion of the packet.

30. The computer-readable medium of claim 29 wherein the operations further cause the one or more processors to:

include a preamble and the regular range header in the packet; and modulate the packet for transmission to a mobile station using direct sequence spread-spectrum (DSSS) modulation, wherein the preamble comprises a synchronization field for channel estimation and the start frame delimiter, wherein the regular range header comprises a physical layer convergence protocol (PLCP) header, and wherein the preamble is included and the packet is modulated for both a regular range mobile station and an extended range mobile station.

\* \* \* \* \*